United States Patent [19]

Müennich et al.

[11] 4,162,109
[45] Jul. 24, 1979

[54] BONDED GUIDE RIM IN A RACE FOR A ROLLING BEARING

[75] Inventors: Hermann Müennich, Bad Kissingen; Klaus Kispert, Schweinfurt, both of Fed. Rep. of Germany

[73] Assignee: SKF Kugellagerfabriken GmbH, Schweinfurt, Fed. Rep. of Germany

[21] Appl. No.: 764,975

[22] Filed: Feb. 2, 1977

[30] Foreign Application Priority Data

Feb. 7, 1976 [DE] Fed. Rep. of Germany ... 7603570[U]

[51] Int. Cl.² .............................................. F16C 33/58
[52] U.S. Cl. .................................... 308/216; 308/196; 308/235
[58] Field of Search .................. 308/196, 188, 189 R, 308/213–216, 212, 236, 235, 217; 156/309

[56] References Cited

U.S. PATENT DOCUMENTS

| | | | |
|---|---|---|---|
| 2,567,242 | 9/1951 | Smith | 308/213 |
| 3,208,804 | 9/1965 | Sternert | 308/216 |
| 3,656,825 | 4/1972 | Manger | 308/213 |
| 3,958,847 | 5/1976 | Cain | 308/196 |
| 3,980,354 | 9/1976 | Lamprecht | 308/216 |

*Primary Examiner*—Trygve M. Blix
*Assistant Examiner*—D. W. Keen
*Attorney, Agent, or Firm*—Daniel M. Rosen

[57] ABSTRACT

A rolling bearing construction wherein a guide rim is secured to a ring incorporating the race for the guide rim by the interposition of a bonding film of a hardening, cross-linking resin.

14 Claims, 9 Drawing Figures

*Fig: 6a*

BONDED GUIDE RIM IN A RACE FOR A ROLLING BEARING

BACKGROUND OF THE INVENTION

The present invention relates to rolling bearings, and particularly to rolling bearing races with emplaced bonded guide rims.

Conventional constructions are known for races employed in rolling bearings. In such conventional race constructions, the rims are attached to the proper race with one- or two-component liquid adhesives. However, conventional adhesives employed in the prior art have the disadvantage that they may escape from the joint during the process of setting, and adhere to the interior of the bearing, such as on the rolling members. Furthermore, the tensile and shearing strength of these known adhesives decrease with rising temperature, so that the load capacity of the rims diminishes at higher temperatures. Lastly, it is also possible that creeping of the bonded connection may occur under long-term loads.

It is therefore the prime object of the present invention to avoid the disadvantages of known devices and provide a rolling bearing race with bonded guide rim wherein accidental escape of adhesive and creeping of the bonded connection are avoided, and continued service, even at elevated temperatures is provided.

SUMMARY OF THE INVENTION

The foregoing object is achieved, according to the present invention, by securing the guide rim to the ring incorporating the race with the interposition of a bonding adhesive film of hardening, cross-linking resins, such as, for example, phenolic resin, melamine resin and others.

The use of an adhesive film, between 0.02 and 0.3 mm in thickness depending on bearing size, removes the danger of leakage of adhesive from the joint during the setting process. Furthermore, with an adhesive film of a hardening, cross-linking resin, there is practically no tendency to creep. Also, the diminution of tensile and shearing strength as a function of temperature is less in such films than in one- and two-component thermoplastic adhesives.

Other features of the present invention, and particularly the bonded connection, will be described below with reference to embodiments represented in the drawings, by way of example, wherein:

BRIEF DESCRIPTION OF THE DRAWINGS

FIGS. 6a and 6b show two further embodiments of single-row taper roller bearings with guide rims bonded in place.

DETAILED DESCRIPTION OF THE PREFERRED EMBODIMENTS

Figure 1:
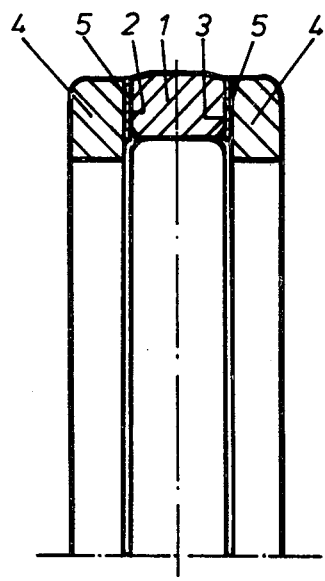
FIG. 1 shows the outer race of a single-row cylindrical roller bearing with guide rim bonded in place axially.

The outer race of FIG. 1 includes a ring 1 incorporating the race and two guide rims 4 bonded axially in place on the faces 2 and 3, their outside diameter being less than that of the ring 1. Between the ring 1 and each of the guide rims 4, according to the present invention, an adhesive film 5 of a certain thickness is arranged. To produce the race, first the adhesive film 5 is applied to one of the parts 1 and 4. Then the bearing is assembled in a centering fixture and thermoset by being kept, under load, at the hardening temperature during the process of setting.

By way of example and illustration, and not intending to be limiting, the following film adhesives, and their respective hardening times and temperatures may be employed. It will be clear that variations, substitutions, and modifications are possible.

| Tradename | Supplier | Base Material | Temp. | Time |
| --- | --- | --- | --- | --- |
| Technicoll | Biersdorf AG Hamburg, Germany | Nitrile Caoutchouc Phenolic resin | 180° C. | 5 min |
| Scotchweld Af42 | 3M Company Minneapolis, Minn. | Nylon epoxy resin | 166° C. | 30 min |
| Tegofilm VP375 | T. H. Goldschmidt AG Germany | Epoxy resin | 137° C. | 10 min |

Note:
(a) Guide rim material and race ring material are each steel.
(b) Chamfer angle is about 5°.

Figure 2:
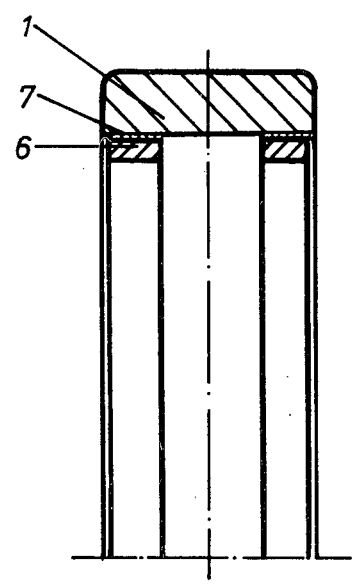
FIG. 2 shows likewise an outer race for a single-row cylindrical roller bearing, with guide rims radially bonded in place.

In the embodiment of FIG. 2, the guide rims 6 are slitted or unslitted rings inserted in the bore of the ring 1 incorporating the race. The adhesive film 7 is arranged in circumferential direction between the ring 1 and the guide rims 6. By suitable choice of fit allowance between the bore of ring 1 and the peripheral surfaces of the unslitted guide rims 6, contact force may be dispensed with during the setting operation. To assemble the parts, the ring 1 may be heated and/or the guide rims 6 may be chilled.

Of course, it is possible alternatively to apply the technique of the present invention to the inner races, in which case the guide rims may be secured to the faces or to the periphery of the ring incorporating the inner race.

Figure 3:
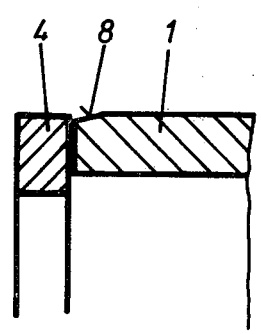
FIG. 3 shows a portion of an outer race according to FIG. 1 drawn to a larger scale.

For better compatibility of the outer races of FIG. 1 with the housing and of inner races similarly constructed in obvious manner with shafts, and to avoid scoring, it is expedient to provide a chamfer 8, as shown in FIG. 3, with the recommended optimum angles. The chamfer 8 is protected against damage by the bonded guide rims 4.

Figure 4:
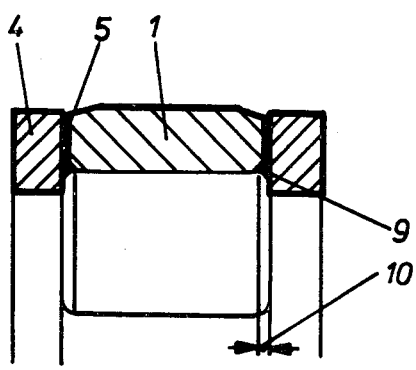
FIG. 4 shows a portion of an outer race according to FIG. 1 drawn to a larger scale, with the race chamfered to diminish edge stresses including a typical cylindrical roller.

When rolling members roll in contact with races of like width, edge stresses are less than in the case of races projecting laterally beyond the rolling members, with or without guide rims. This is an advantage in cylinder roller bearings with guide rims bonded in place laterally as in FIG. 1. Through use of a greater joint thickness than is possible for one- and two-component adhesives, restraint of deformation by the bonded guide rims is avoided. With a view to minimal edge stresses, it is desirable, as in FIG. 4, to chamfer the edges 9 of the races far enough to match the radii 10 on the rollers.

Figure 5A:
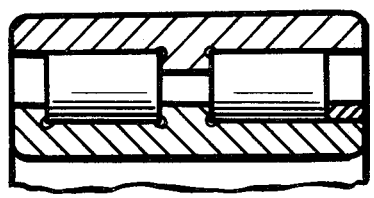
FIGS. 5a–5c show several embodiments of two-row cylindrical roller bearings with rims bonded in place.
Figure 5B:
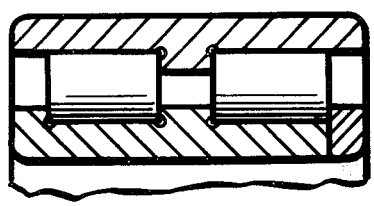
Figure 5C:
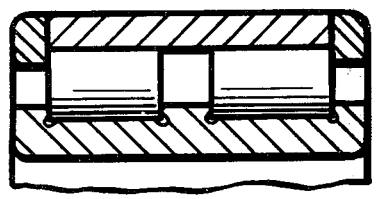

FIGS. 5a-c show several embodiments made in accordance with the present invention of two-row cylinder roller bearings in cross-section, at least one of the guide rims being formed separately from the races and subsequently connected thereto by means of an adhesive film.

Figure 6B:
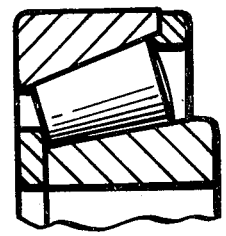
Figure 6B:
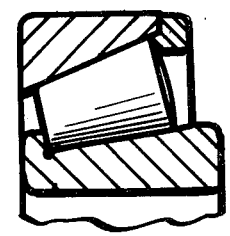

FIG. 6 shows two further embodiments made with a bonded connection according to the present invention for taper roller bearings, where the rims are so arranged on the races that the bearing is able to assume thrusts in both directions.

The present invention is analogously applicable, in addition to single- and multi-row cylinder and taper roller bearings, to two-row angular ball bearings, paired angular ball bearings and four-point bearings.

Other variations, modifications, substitutions and alternatives for the technique and construction described will be apparent to those skilled in the art, within the spirit and scope of the present invention.

We claim:

1. In a bearing including outer and inner races and a plurality of roller elements distributed in at least one raceway defined between said races, the improvement in combination therewith, wherein one of said races comprises an annular member about a central axis with opposite end portions, a separate guide rim means having at least a portion extending radially closer to the other race than one of said end portions, said guide rim means and one end portion defining a pair of adjacent surfaces, and attachment means comprising a strip of cured thermo-setting cross-linked resin situated between said adjacent surfaces, said strip having opposite sides engaging and bonded to said surfaces and comprising substantially the sole means on said bearing for securing said guide rim means to said annular member, said roller elements axially engaging said radially extending portion of said guide rim means whereby thrust forces on said bearing are applied to said strip.

2. A bearing according to claim 1 wherein said resin is selected from the group consisting of phenolic resin, melamine resin, Technicoll$_{TM}$, Scotchweld Af42$_{TM}$ and Tegofilm VP375$_{TM}$.

3. A bearing according to claim 2 wherein said strip has thickness in the range of 0.02 to 0.3 millimeters.

4. A bearing according to claim 1 wherein said pair of adjacent surfaces extends generally axially and said guide rim means is a ring situated totally radially inward of said annular member.

5. A bearing according to claim 4 wherein said guide rim means comprises a pair of similar rings, one at each of said end portions of the annular member.

6. A bearing according to claim 1 wherein said pair of adjacent surfaces extend generally radially, and each of said guide rim means is a ring situated totally axially outward of an end portion.

7. A bearing according to claim 6 wherein said guide rim means comprises a pair of similar rings, one at each of said end portions of the annular member.

8. A bearing according to claim 1 wherein said annular member has opposite bore and outer surfaces, and said end portions are chamfered on at least one of said bore and outer surfaces.

9. A bearing according to claim 8 wherein said annular member end portions are chamfered on both of said radially inward and outward surfaces.

10. A bearing according to claim 8 wherein said annular member has a circumferentially extending bearing surface with said guide rim means at each end thereof, and said roller elements have chamfered end edges generally adjacent the chamfered end edges of said annular member.

11. A bearing according to claim 1 wherein the roller elements are tapered rollers, and said guide rim means comprises a first ring extending generally radially inward from one end of said outer race.

12. A bearing according to claim 11 wherein said guide rim means comprises a second ring extending generally radially outward from the opposite end of said inner race.

13. In a method of manufacturing a bearing which includes inner and outer races, a plurality of rolling elements distributed in at least one raceway defined between said races, and a guide rim having at least a portion extending generally radially beyond at least one end portion of at least one of said races toward the other race and axially engaging said rolling elements, said guide rim and the adjacent end portion of said one race having adjacent and spaced apart surfaces, the improvement in securing said guide rim to said end portion, comprising the steps: (a) applying a film of thermo-setting cross-linking resin to one of said surfaces of said race and guide rim, (b) then centering said guide rim and end surface, (c) and then urging said surfaces toward each other and thereby compressing said strip, and (d) heating said strip and said adjacent surfaces while they are compressed, until it cures and bonds to said surfaces.

14. In a method of manufacturing a bearing which includes inner and outer races, a plurality of rolling elements distributed in at least one raceway defined between said races, and a guide rim extending generally radially inward from the bore of at least one end portion of said outer race, toward said inner race and axially engaging said rolling elements the improvement in securing said guide rim in said bore wherein said guide rim outer surface diameter corresponds closely to said bore inner diameter, comprising the steps: (a) establishing a clearance fit between said bore and the outer surface of the guide rim, by heating said outer race and/or cooling said guide rim, (b) positioning said guide rim within said bore, thereby defining a pair of adjacent surfaces with an annular space therebetween, (c) and positioning a ring (strip) of thermo-setting, crosslinking resin in said annular space, (d) then reducing said clearance fit established by said step (a) until said strip is under a compression load, and (e) then heating said strip under load until it cures and bonds to said adjacent surfaces.

* * * * *